(12) United States Patent
Tian et al.

(10) Patent No.: US 8,913,105 B2
(45) Date of Patent: Dec. 16, 2014

(54) JOINT DEPTH ESTIMATION

(75) Inventors: Dong Tian, Plainsboro, NJ (US); Po-Lin Lai, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 13/143,296

(22) PCT Filed: Dec. 16, 2009

(86) PCT No.: PCT/US2009/006568
§ 371 (c)(1),
(2), (4) Date: Jul. 5, 2011

(87) PCT Pub. No.: WO2010/144074
PCT Pub. Date: Dec. 16, 2010

(65) Prior Publication Data
US 2011/0268177 A1    Nov. 3, 2011

Related U.S. Application Data

(60) Provisional application No. 61/204,485, filed on Jan. 7, 2009.

(51) Int. Cl.
*G06K 9/00* (2006.01)
*H04N 13/00* (2006.01)
*H04N 7/26* (2006.01)
*G06T 7/00* (2006.01)

(52) U.S. Cl.
CPC ..... *G06T 7/0071* (2013.01); *G06T 2207/10016* (2013.01)
USPC .......................................................... 348/46

(58) Field of Classification Search
None
See application file for complete search history.

(56) References Cited

U.S. PATENT DOCUMENTS

| 5,452,104 A | 9/1995 | Lee |
| 5,517,245 A | 5/1996 | Kondo et al. |
| 5,557,684 A | 9/1996 | Wang et al. |
| 5,767,907 A | 6/1998 | Pearlstein |

(Continued)

FOREIGN PATENT DOCUMENTS

| CN | 1830217 | 9/2006 |
| CN | 1913640 | 2/2007 |

(Continued)

OTHER PUBLICATIONS

Liatsis, P., et al., "Depth estimation via parallel coevolution of disparity functions for area-based stereo", Proceedings of SPIE vol. 4190 (2001), pp. 169-180.

(Continued)

*Primary Examiner* — Hung Dang
*Assistant Examiner* — Sunghyoun Park
(74) *Attorney, Agent, or Firm* — Robert D. Shedd; Brian J. Cromarty (57) ABSTRACT

Various implementations are described. Several implementations relate to joint depth estimation for multiple depth maps. In one implementation, a first-view depth indicator for a location in a first view is estimated, and a second-view depth indicator for a corresponding location in a second view is estimated. The estimating of one or more of the first-view depth indicator and the second-view depth indicator is based on a constraint. The constraint provides a relationship between the first-view depth indicator and the second-view depth indicator for corresponding locations.

8 Claims, 7 Drawing Sheets

(56) References Cited

U.S. PATENT DOCUMENTS

| | | | |
|---|---|---|---|
| 6,064,393 A | 5/2000 | Lengyel et al. | |
| 6,111,979 A | 8/2000 | Katto | |
| 6,188,730 B1 | 2/2001 | Ngai et al. | |
| 6,320,978 B1 | 11/2001 | Szeliski et al. | |
| 6,326,964 B1 | 12/2001 | Snyder et al. | |
| 6,348,918 B1 | 2/2002 | Szeliski et al. | |
| 6,504,872 B1 | 1/2003 | Fimoff et al. | |
| 6,940,538 B2 | 9/2005 | Rafey et al. | |
| 7,003,136 B1 | 2/2006 | Harville | |
| 7,289,674 B2 | 10/2007 | Karczewicz | |
| 7,671,894 B2 | 3/2010 | Yea et al. | |
| 8,538,159 B2 | 9/2013 | Lu | |
| 8,593,506 B2 | 11/2013 | Peleg et al. | |
| 2002/0110273 A1 | 8/2002 | Dufour | |
| 2003/0235338 A1 | 12/2003 | Dye | |
| 2004/0095999 A1 | 5/2004 | Piehl et al. | |
| 2005/0286759 A1 | 12/2005 | Zitnick, III et al. | |
| 2006/0031915 A1 | 2/2006 | Winder et al. | |
| 2006/0072852 A1 | 4/2006 | Kang et al. | |
| 2006/0232666 A1 | 10/2006 | Beeck | |
| 2007/0030356 A1 | 2/2007 | Yea et al. | |
| 2007/0035530 A1 | 2/2007 | Van Geest et al. | |
| 2007/0103465 A1 | 5/2007 | Barenbrug et al. | |
| 2007/0104276 A1 | 5/2007 | Ha | |
| 2007/0109409 A1* | 5/2007 | Yea et al. | 348/153 |
| 2007/0171987 A1 | 7/2007 | Trimeche | |
| 2007/0291850 A1 | 12/2007 | Ishikawa et al. | |
| 2008/0303892 A1 | 12/2008 | Kim et al. | |
| 2008/0310499 A1 | 12/2008 | Kim et al. | |
| 2009/0129667 A1* | 5/2009 | Ho et al. | 382/154 |
| 2009/0185627 A1 | 7/2009 | Park et al. | |
| 2010/0021072 A1 | 1/2010 | Shimizu et al. | |
| 2010/0188476 A1 | 7/2010 | Thapa | |
| 2010/0195716 A1 | 8/2010 | Klein Gunnewiek | |
| 2011/0038418 A1 | 2/2011 | Pandit et al. | |
| 2011/0142138 A1 | 6/2011 | Tian et al. | |
| 2011/0261050 A1* | 10/2011 | Smolic et al. | 345/419 |
| 2011/0268177 A1 | 11/2011 | Tian et al. | |

FOREIGN PATENT DOCUMENTS

| | | |
|---|---|---|
| CN | 1984335 | 6/2007 |
| CN | 101166271 | 4/2008 |
| JP | 8018976 | 1/1996 |
| JP | 9289638 | 11/1997 |
| JP | 10178639 | 6/1998 |
| JP | 2000023198 | 1/2000 |
| JP | 2000078611 A2 | 3/2000 |
| JP | 2000215311 | 8/2000 |
| JP | 2000231985 A2 | 8/2000 |
| JP | 202015311 | 1/2002 |
| JP | 2002058031 A2 | 2/2002 |
| JP | 2003306710 | 10/2003 |
| KR | 2009-0055803 | 6/2009 |
| WO | 03/105070 A1 | 12/2003 |
| WO | 2005/013623 A1 | 2/2005 |
| WO | 2007/047736 A2 | 4/2007 |
| WO | 2008/007913 A1 | 1/2008 |
| WO | WO2008035665 | 3/2008 |
| WO | 2008/049052 A2 | 4/2008 |
| WO | 2008/133455 A1 | 11/2008 |
| WO | 2009/001255 A1 | 12/2008 |
| WO | WO2009001255 | 12/2008 |
| WO | 2009/023044 A2 | 2/2009 |
| WO | 2009/069958 A2 | 6/2009 |
| WO | 2009/131703 A2 | 10/2009 |
| WO | 2010/021664 A1 | 2/2010 |
| WO | 2010/021666 A1 | 2/2010 |
| WO | WO2010144074 | 12/2010 |

OTHER PUBLICATIONS

International Search Report, dated Feb. 17, 2010.
W.J. Tam, et al., "Smoothing Depth Maps for Improved Stereoscopic Image Quality", Communications Research Centre Canada, 4 pages, Ontario, Canada.
Takeo Kanade, et al., "A Stereo Matching Algorithm with an Adaptive Window: Theory and Experiment", IEEE Transactions on Pattern Analysis and Machine Intelligence, Sep. 1994, pp. 920-932, vol. 16.
Anthony Vetro, et al., "Towards a 3D Video Format for Auto-Stereoscopic Displays", SPIE Conference on Applications of Digital Image Processing XXXI, Sep. 2008, 10 pages, Mitsubishi Electric Research Laboratories, Cambride, Massachusetts.
Karsten Muller, et al., "View Synthesis for Advanced 3D Video Systems", EURASIP Journal on Image and Video Processing, Nov. 2008, pp. 1-14, vol. 2008, Hindawi Publishing Corporation, Berlin, Germany.
Emin Martinian, et al., "View Synthesis for Multiview Video Compression", Mitsubishi Electric Research Labs, 5 pages, Cambridge Massachusetts.
International Organisation for Standardisation Organisation Internationale DE Normalisation, "Description of Exploration Experiments in 3D Video Coding", ISO/IEC JTC1/SC29/WG11, MPEG2008/N10173, Oct. 2008, 11 pages, Busan, Korea.
Philipp Merkle, et al., "Efficient Compression of Multi-View Depth Data Based on MVC", Fraunhofer Institute for Telecommunications, 4 pages, Image Processing Department, Berlin, Germany.
P. Merkle, et al., "Efficient Compression of Multi-View Video Exploiting Inter-View Dependencies Based on H.264/MPEG-AVC", IEEE, Fraunhofer Institute for Telecommunications, Heinrich-Hertz-Institut, Image Processing Department, Berlin, Germany.
Stefan Grewatsch, et al., "Evaluation of Motion Compensation and Coding Strategies for Commpression of Depth Map Sequences", Mathematics of Data/Image Coding, Compression and Encryption VII, pp. 117-124, SPIE vol. 5561, Rostock, Germany.
International Standard, "Information technology—MPEG video technologies—Part 3: Representation of auxiliary video and supplemental information", ISO/IEC 2007, ISO/IEC 23002-3, First Edition, Oct. 15, 2007.
Dong Tian, et al., "3DV EE1 & EE2 on Leaving_Laptop", International Organisation for Standardisation Organisation Internationale De Normalisation ISO/IEC JTC1/SC29/WG11, Oct. 2008, 10 pages, Busan, Korea.
Alijoscha Smolic, et al., "3D Video and Free Viewpoint Video-Technologies, Applications and MPEG Standards", IEEE, 2006, pp. 2161-2164, Fraunhofer Institute for Telecommunications, Berlin, Germany.
Oliver Schreer, et al., "3D Videocommunication Algorithms, concepts and real-time systems in human centred communication", John Wiley & Sons, Ltd., Title Page Table of Contents, Berlin, Germany.
International Telecommunication Union, "Advanced video coding for generic audiovisual services", ITU-T Telecommunication Standardization Sector of ITU, May 2003, pp. 1-282, H.264, Geneva, Switzerland.
International Telecommunication Union, "Advanced video coding for generic audiovisual services", ITU-T Telecommunication Standardization Sector of ITU, Mar. 2005, pp. 1-343, H.264, Geneva, Switzerland.
Erhan Ekmekcioglu, et al., "Bit-Rate Adaptive Downsampling for the Coding of Multi-View Video with Depth Information", IEEE, 3DTV-CON, May 2008, pp. 137-140, IEEE2008, Istanbul, Turkey.
International Organisation for Standardisation Organisation Internationale De Normalisation, "Call for Contributions on 3D Video Test Material (Update)", ISO/IEC JTC1/SC29/WG11, Jan. 2008, 19 pages, Antalya, Turkey.
Aljoscha Smolic, et al., "Coding Algorithms for 3DTV—A Survey", IEEE Transactions on Circuits and Systems for Video Technology, Nov. 2007, pp. 1606-1621, vol. 17, No. 11.
Ravi Krishnamurthy, et al., "Compression and Transmission of Depth Maps for Image-Based Rendering", IEEE, 2001, pp. 828-831, Sarnoff Corporation, Princeton, New Jersey.
Jia-Wei Chen, "A Condition-based Intra Prediction Algorithm for H.264/AVC", IEEE, 2006, pp. 1077-1080, National Chung-Cheng University, Taiwan, Republic of China.
Serdar Ince, "Depth Estimation for View Synthesis in Multiview Video Coding", IEEE, 2007, Mitsubishi Electric Research Laboratories, Cambridge, Massachusetts.

(56) References Cited

OTHER PUBLICATIONS

Yannick Morvan, et al., "Depth-Image Compression Based on an R-D Optimized Quadtree Decomposition for the Transmission of Multiview Images", IEEE, 2007, V-105-V-108, University of Technology, Eindhoven, Netherlands.

P. Kauff, "Depth map creation and image-based rendering for advanced 3DTV services providing interoperability and scalability", Signal Processing: Image Communication, Nov. 2006, pp. 217-234, vol. 22, Berlin, Germany.

Emin Martinian et al., "Extensions of H.264/AVC for Multiview Video Compression", ICIP, 2006, IEEE, pp. 2981-2984, Mitsubishi Electric Research Labs, Cambridge, Massachusetts.

Bojun Meng, et al., "Fast Intra-Prediction Mode Selection for 4×4 Blocks in H.264", IEEE, 2003, pp. 389-392, Dept. of Electrical and Electronic Engineering, Hong Kong.

Han Oh, et al., "H.264-Based Depth Map Sequence Coding Using Motion Information of Texture Video", Department of Information and Communications, 2006, pp. 898-907, Gwangju Institute of Science and Technology, Jun. 2006.

Shang-Hong Lai, et al., "A Generalized Depth Estimation Algorithm with a Single Image", IEEE Transactions on Pattern Analysis and Machine Intelligence, Apr. 1992, pp. 405-411, vol. 14, No. 4.

Aljoscha Smolic, et al., "Intermediate View Interpolation Based on Multiview Video Plus Depth for Advanced 3D Video Systems", ICIP 2008, IEEE, pp. 2448-2451, Image Processing Department, Berlin, Germany.

Gang Zhu, et al., "Inter-view Skip Mode with Depth Information", Joint Video Team (JVT) of ISO/IEC MPEG & ITU-T VCEG (ISO/IEC JTC1/SC29/WG11 and ITU-T SG16 0.6, Jan. 2008, pp. 1-9, JVT-Z029, Antalya, Turkey.

Anthony Vetro, et al., "Join Draft 3.0 on Multiview Video Coding", ISO/IEC JTC1/SC29/WG11 and ITU-T SG16 Q.6, Apr. 2007, pp. 1-39, JVT-W209, San Jose, USA.

Anthony Vetro et al., "Joint Draft 6.0 on Multiview Video Coding", JVT of ISO/IEC MPEG & ITU-T VCEG (ISO/IEC JTC1/SC29/WG11 and ITU-T SG16 Q6, Jan. 2008, pp. 1-41, JVT-Z209, Antalya, Turkey.

Anthony Vetro, et al., "Joint Multiview Video Mode (JMVM) 6.0", JVT of ISO/IEC MPEG & ITU-T VCEG (ISO/IEC JTC1/SC29/WG11 and ITU-T SG16 Q.6, Oct. 2007, pp. 1-10, JVT-Y207, Shenzhen, CN.

Sang-Tae Na, et al., "Multi-view Depth Video Coding using Depth View Synthesis", IEEE, 2008, pp. 1400-1403, Gwangju Institute of Science and Technology (GIST), Gwangju, Korea.

Burak Ozkalayci, et al. "Multi-view Video Coding via Dense Depth Estimation", 4 pages, Department of Electrical and Electronics Engineering, Middle East Technical University, Ankara, Turkey.

Philipp Merkle, et al., "Multi-View Video Plus Depth Representation and Coding", IEEE, 2007, pp. 1-201-1-204, Image Communication Group, Berlin, Germany.

Han-Suh Koo, et al., "MVC Motion Skip Mode", ISO/IEC MPEG & ITU-T VCEG (ISO/IEC JTC1/SC29/WG11 and ITU-T SG 16 Q.6), Apr. 2007, pp. 1-13, JVT-W081, Digital Media Research Lab., San Jose, California.

Gang Zhu, et al., "Presentation for JVT-Z029—MVC Inter-view Skip Mode with Depth Information", Video Communication Research Group.

Masayuki Tanimoto, et al., "Reference Softwares for Depth Estimation and View Synthesis", ISO/IEC JTC1/SC29/WG11, MPEG2008/M15377, Apr. 2008, 18 pages, Nagoya University, Archamps, France.

Cevahir Cigla, et al., "Region-Based Dense Depth Extraction from Multi-View Video", IEEE, Department of Electrical and Electronics Engineering, 2007, pp. 213-216, ICIP 2007, Turkey.

Sehoon Yea, et al., "Report on Core Experiment CE3 of Multiview Coding", ISO/IEC JTC1/SC29/WG11, Jul. 2006, 14 pages, Document M13695, Klagenfurt, Austria.

Stefan Grewatsch et al., "Sharing of Motion Vectors in 3D Video Coding", International Conference on Image Processing (ICIP), IEEE, 2004, pp. 3271-3274, University of Rostock, Institute of Comunications Engineering, Rostock, Germany.

Thomson, "Infra Skip Mode for Depth Coding", Corporate Research, Jun. 2008, 10 pages, Princeton, New Jersey.

Seitz et al., "View Morphing", (1996) SIGGRAPH '96 Proceedings of the 23rd Annual Conference on Computer Grahics and Interative Techniques, pp. 21-30.

Yoon et al., "A Framework for Representation and Processing of Multi-view Video Using the Concept of Layered Depth Image," Journal of VLSI Signal Processing, 46, (Mar. 2007), pp. 87-102.

Smolic et al., "Multi-view video plus depth (MVD) format for advanced 3D video systems", 23 Mtg. San Jose, CA, USA, Apr. 21-27, 2007, JVT of ISO/IEC MPEG & ITU-T VCEG, JVT-W100, p. 1-7.

Imaizumi, et al, "Depth Estimation Algorithm for Multiocular Images using Distribution of Matching Cost on an Epipolar Line", IPSF SIG Technical Reports, 2000-CVIM-120, vol. 2000, No. 7, pp. 9-16, Information Processing Society of Japan, Jan. 2000.

\* cited by examiner

JOINT DEPTH ESTIMATION

CROSS-REFERENCE TO RELATED APPLICATIONS

This application claims the benefit, under 35 U.S.C. §365 of International Application PCT/US2009/006568, filed Dec. 16, 2009, which was published in accordance with PCT Article 21/(2) on Dec. 16, 2010 in English and which claims the benefit of U.S. provisional patent application No. 61/204,485, filed on Jan. 7, 2009.

TECHNICAL FIELD

Implementations are described that relate to coding systems. Various particular implementations relate to joint depth estimation.

BACKGROUND

Three-dimensional video (3DV) is a framework directed to generating high-quality 3D rendering at the receiver side. This enables 3D visual experiences with auto-stereoscopic displays, free-view point applications, and stereoscopic displays. In 3DV applications, a reduced number of video views and corresponding depth maps, typically referred as multi-view plus depth (MVD), are transmitted or stored due to limitations in transmission bandwidth and/or storage constraints. At the receiver side, additional views are rendered using available views and depth maps.

SUMMARY

According to a general aspect, a first-view depth indicator for a location in a first view is estimated, and a second-view depth indicator for a corresponding location in a second view is estimated. The estimating of one or more of the first-view depth indicator and the second-view depth indicator is based on a constraint. The constraint provides a relationship between the first-view depth indicator and the second-view depth indicator for corresponding locations.

The details of one or more implementations are set forth in the accompanying drawings and the description below. Even if described in one particular manner, it should be clear that implementations may be configured or embodied in various manners. For example, an implementation may be performed as a method, or embodied as apparatus, such as, for example, an apparatus configured to perform a set of operations or an apparatus storing instructions for performing a set of operations, or embodied in a signal. Other aspects and features will become apparent from the following description considered in conjunction with the accompanying drawings and the claims.

BRIEF DESCRIPTION OF THE DRAWINGS

FIG. 7, which includes

DETAILED DESCRIPTION

In many 3DV applications, intermediate views (virtual views) can be generated and such generating is typically referred to as rendering. Rendering may be performed using, for example, the technique of Depth Image Based Rendering (DIBR), which takes the transmitted/stored views (reference views) and the associated per-pixel depth maps as input. Such input may be, for example, provided by an MVD format. Depth may be captured using any of a variety of techniques. However, often only video is provided and depth is estimated. To obtain depth maps, depth estimation techniques are often used to find correspondence among different views.

It can be a challenging task to generate a virtual view, especially when the input depth maps are obtained using depth estimation. This is, in part, because the estimated depth maps may be noisy (not accurate), and there may be no other scene information available such as a 3D surface property of the scene. Noisy depth maps may be inaccurate because they do not have the correct depth value. Additionally, a sequence of noisy depth maps can have inaccurate values that are not consistently inaccurate. For example, an object at constant actual depth may be inaccurately estimated in a first picture with a low depth and inaccurately estimated in a second picture with a high depth.

Better view rendering quality can typically be achieved if more reference views are available for DIBR. For example, two reference views may be used to render an intermediate view. In the case of multiple reference views, the depth map of each reference view is estimated if not already known. However, the multiple depth maps of different views are typically estimated independently from each other. As mentioned, one of the challenges of DIBR methods is the fact that the estimated depth maps are often inconsistent across views. This may lead to poor rendering quality when a virtual view is rendered with two or more inconsistent depth maps.

In at least one implementation, we propose estimating the depth maps of the reference views with a joint depth estimation. The joint depth estimation performs depth estimation for multiple reference views in a joint process, rather than independently. The joint depth estimation obtains depth maps of different views that are more consistent, leading to better quality in the DIBR rendered views.

In at least one implementation, two depth maps are generated based on an intermediate view. The implementation develops a constraint that provides a relationship between corresponding locations in the two depth maps. This constraint can be used in various ways to provide consistency between the two depth maps.

In at least one implementation, the joint depth estimation involves a summing operation performed on respective disparity estimation costs (distortions) for disparities between corresponding pixel locations in two or more views.

In at least another implementation, the joint depth estimation involves the use of a summing operation based on camera distances. In at least one implementation, the summing operation is weighted based on the camera distances.

Figure 1:
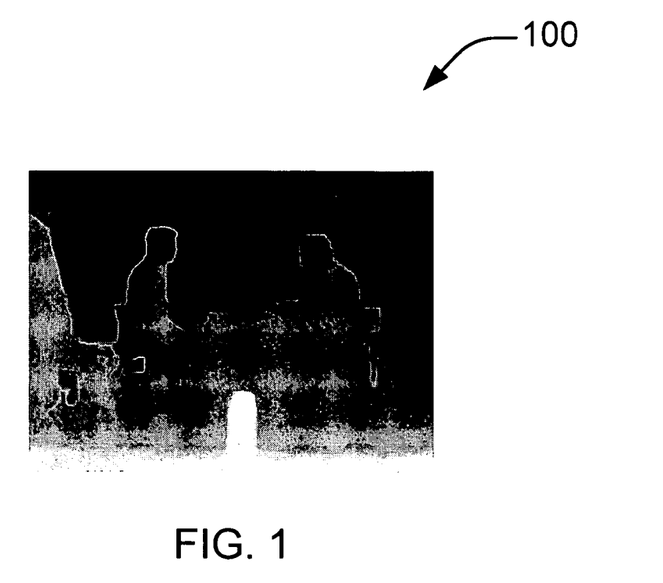
FIG. 1 is an example of a left depth map from a left reference view.
Figure 2:
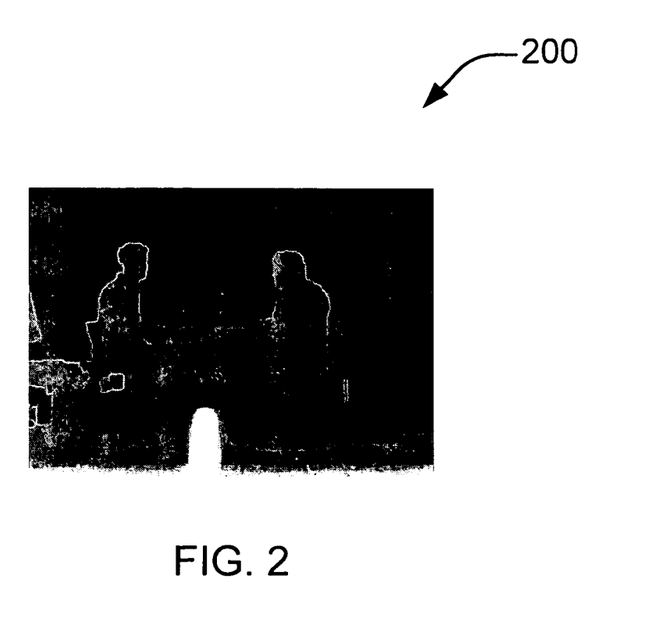
FIG. 2 is an example of a right depth map from a right reference view.

FIG. 1 shows an exemplary left depth map generated for a left reference view corresponding to an MPEG test sequence known as "Leaving_Laptop", to which the present principles may be applied in accordance with an embodiment of the present principles. FIG. 2 shows an exemplary right depth map generated for a right reference view corresponding to the MPEG test sequence known as "Leaving_Laptop", to which the present principles may be applied in accordance with an embodiment of the present principles. Although not readily apparent from the Figures, it can be observed that for some particular areas, the depth levels in the depth map pair can be very different. In particular, the difference can be larger than 40 in the examples of FIGS. 1 and 2. In such instances, the ideal difference is zero, but the observed difference is, for example, larger than 40. This is an example of views that do not have consistent depth maps.

In terms of the number of required input views to estimate one depth map, depth estimation algorithms may typically be divided into the following three categories: single view; stereopsis; and multiple views. All three categories assume that no depth map is known, and use the video from one or more views to generate a depth map.

In typical implementations, with only one single view as input, the camera focus is considered as a mean for depth estimation. A method referred to as "depth-from-focus" may be used to determine the depth based on the amount of defocus or blurring. This method may not be very reliable because, for example, focus estimation often does not provide good results.

A stereopsis method may use a pair of views as input to estimate the depth maps for one of the views. For area-based stereo matching methods, such methods typically match neighboring pixel values within a window between the two images. It is typically critical to select an appropriate window size. In some applications, the window size and shape can be iteratively changed based on the local variation of the intensity and current depth estimates. Some global constraints may be applied to produce a dense depth map, that is, a depth map having unique values and being continuous almost everywhere.

With emerging multiple view content, using multiple views as inputs for depth estimation has been explored. One possible approach is to use three views as inputs (a left view, a center view, and a right view) in order to estimate the depth for the center view.

In typical approaches in the art, the aim is to generate a single dense depth map sequence. When more than one depth map sequence needs to be estimated, the depth estimation is performed for each target view independently, regardless of the category of the depth estimation algorithm. Hence, inconsistency across the views is likely to be present.

Figure 3:
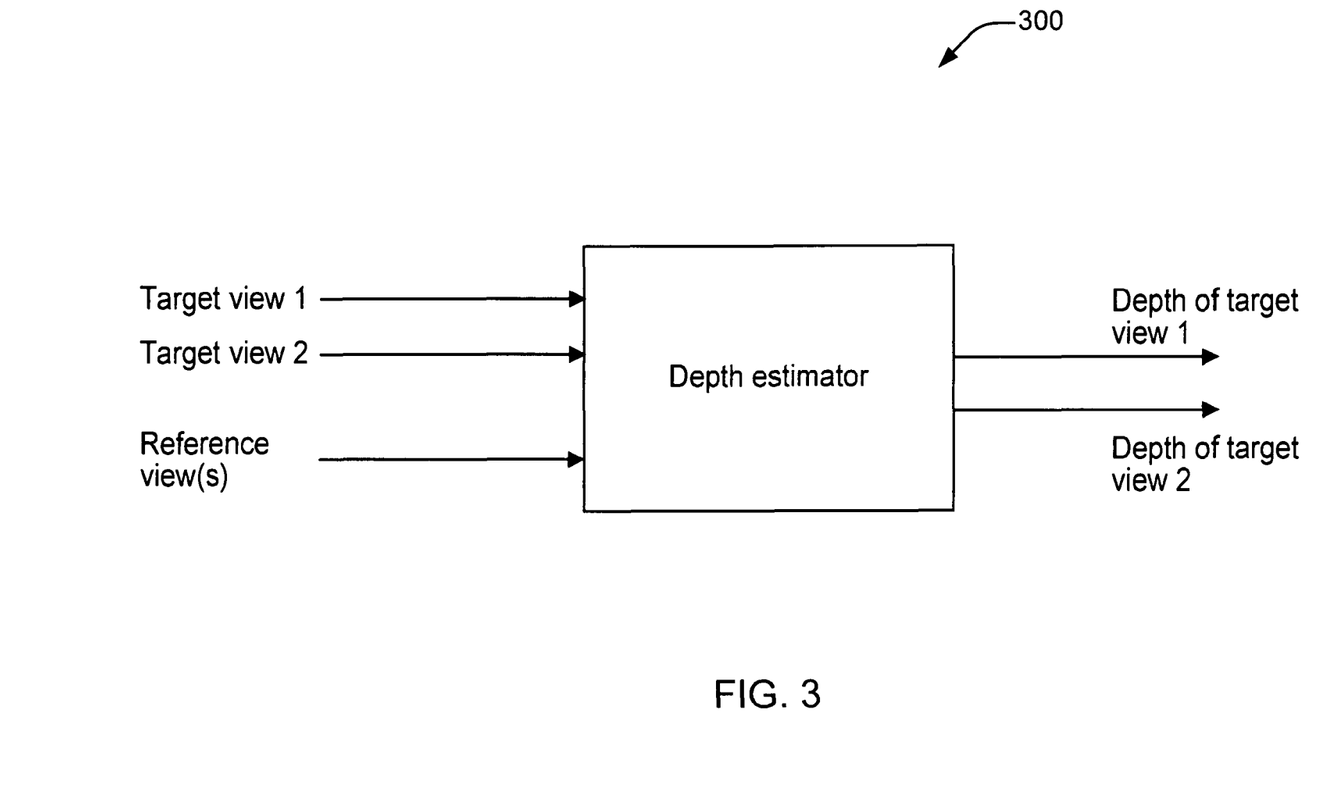
FIG. 3 is a diagram of an implementation of a depth estimator.

FIG. 3 shows an exemplary depth estimator 300 to which the present principles may be applied, in accordance with an embodiment of the present principles. The depth estimator 300 receives a target view 1, a target view 2, and one or more reference views as inputs. The depth estimator 300 provides the estimated depth of target view 1 and the depth of target view 2 as outputs. The operation of the depth estimator 300 is described in further detail herein below.

More generally, the depth estimator 300 provides an estimated depth indicator for target view 1 and an estimated depth indicator for target view 2. A depth indicator may be a depth value, or an entire depth map. But a depth indicator may alternatively be, for example, a disparity value, or an entire disparity map. References to depth in the implementations and descriptions that follow are intended to include other depth indicators, such as, for example, disparity. The depth indicator may provide a depth indication for, for example, an entire target view or a location in a target view. The location may be, for example, a particular pixel, a partition, a sub-macroblock, a macroblock, a slice, or a field.

Figure 4:
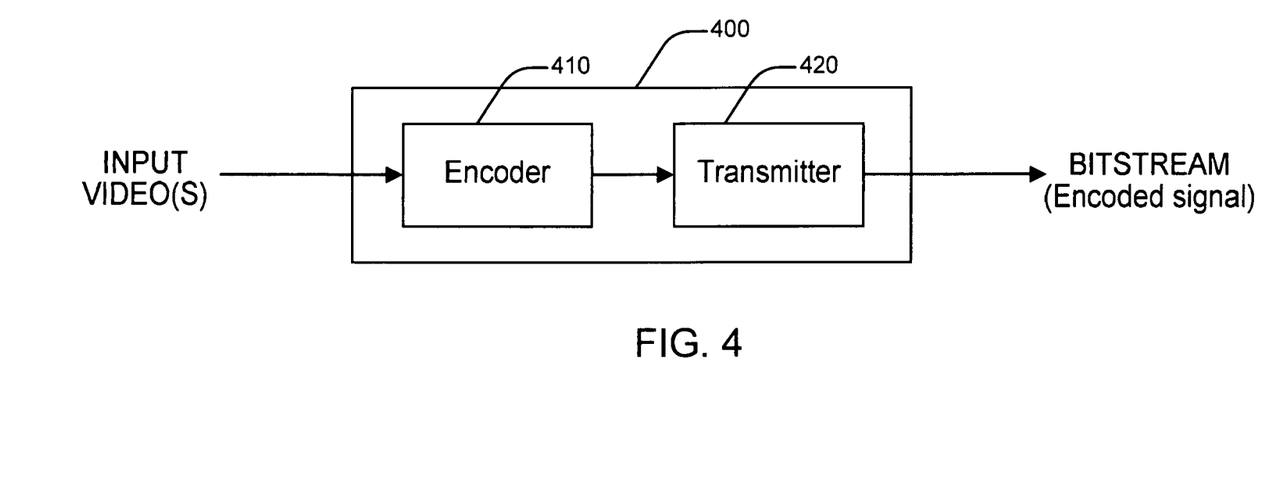
FIG. 4 is a diagram of an implementation of a video transmission system.

FIG. 4 shows an exemplary video transmission system 400, to which the present principles may be applied, in accordance with an implementation of the present principles. The video transmission system 400 may be, for example, a head-end or transmission system for transmitting a signal using any of a variety of media, such as, for example, satellite, cable, telephone-line, or terrestrial broadcast. The transmission may be provided over the Internet or some other network.

The video transmission system 400 is capable of generating and delivering compressed video with depth. This is achieved by generating an encoded signal(s) including depth information or information capable of being used to synthesize the depth information at a receiver end that may, for example, have a decoder.

The video transmission system 400 includes an encoder 410 and a transmitter 420 capable of transmitting the encoded signal. The encoder 410 receives video information and generates an encoded signal(s) with depth. The encoder 410 may include sub-modules, including for example an assembly unit for receiving and assembling various pieces of information into a structured format for storage or transmission. The various pieces of information may include, for example, coded or uncoded video, coded or uncoded depth information, and coded or uncoded elements such as, for example, motion vectors, coding mode indicators, and syntax elements.

The transmitter 420 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers. The transmitter may include, or interface with, an antenna (not shown). Accordingly, implementations of the transmitter 420 may include, or be limited to, a modulator.

The video transmission system 400 may also be included, in whole or part, in a variety of user devices. Such devices include, for example, a cell phone, a laptop or other computer, and a camcorder.

Figure 5:
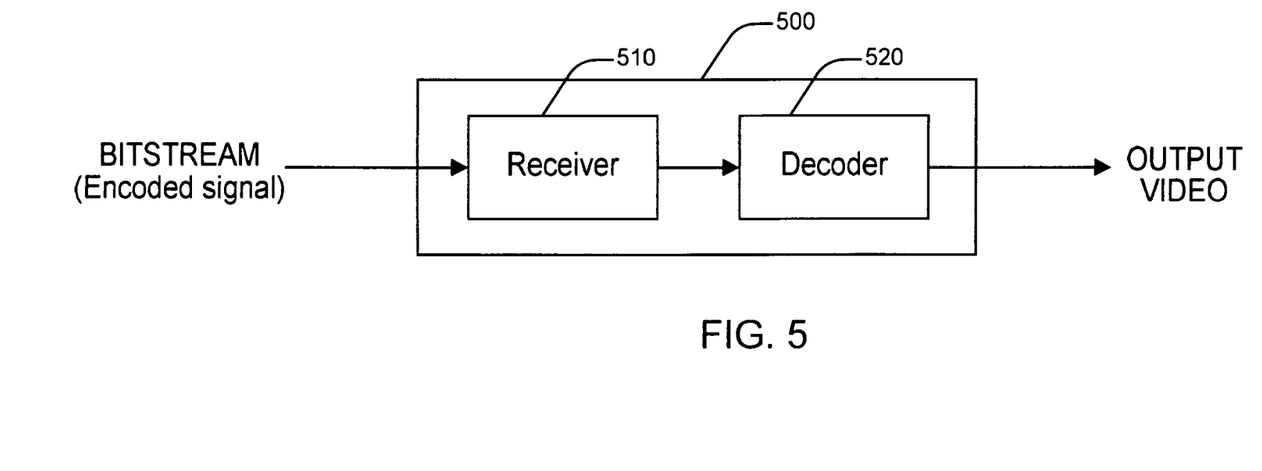
FIG. 5 is a diagram of an implementation of a video receiving system.

FIG. 5 shows an exemplary video receiving system 500 to which the present principles may be applied, in accordance with an embodiment of the present principles. The video receiving system 500 may be configured to receive signals over a variety of media, such as, for example, satellite, cable, telephone-line, or terrestrial broadcast. The signals may be received over the Internet or some other network.

The video receiving system 500 may be, for example, a cell-phone, a computer, a set-top box, a television, or other device that receives encoded video and provides, for example, decoded video for display to a user or for storage. Thus, the video receiving system 500 may provide its output to, for example, a screen of a television, a computer monitor, a computer (for storage, processing, or display), or some other storage, processing, or display device.

The video receiving system 500 is capable of receiving and processing video content including video information. The video receiving system 500 includes a receiver 510 capable of receiving an encoded signal, such as for example the signals described in the implementations of this application, and a decoder 520 capable of decoding the received signal.

The receiver 510 may be, for example, adapted to receive a program signal having a plurality of bitstreams representing encoded pictures. Typical receivers perform functions such as, for example, one or more of receiving a modulated and encoded data signal, demodulating the data signal from one or more carriers, de-randomizing the energy in the signal, de-interleaving the data in the signal, and error-correction decoding the signal. The receiver 510 may include, or interface with, an antenna (not shown). Implementations of the receiver 510 may include, or be limited to, a demodulator. The decoder 520 outputs video signals including, for example, video information and depth information.

Figure 6:
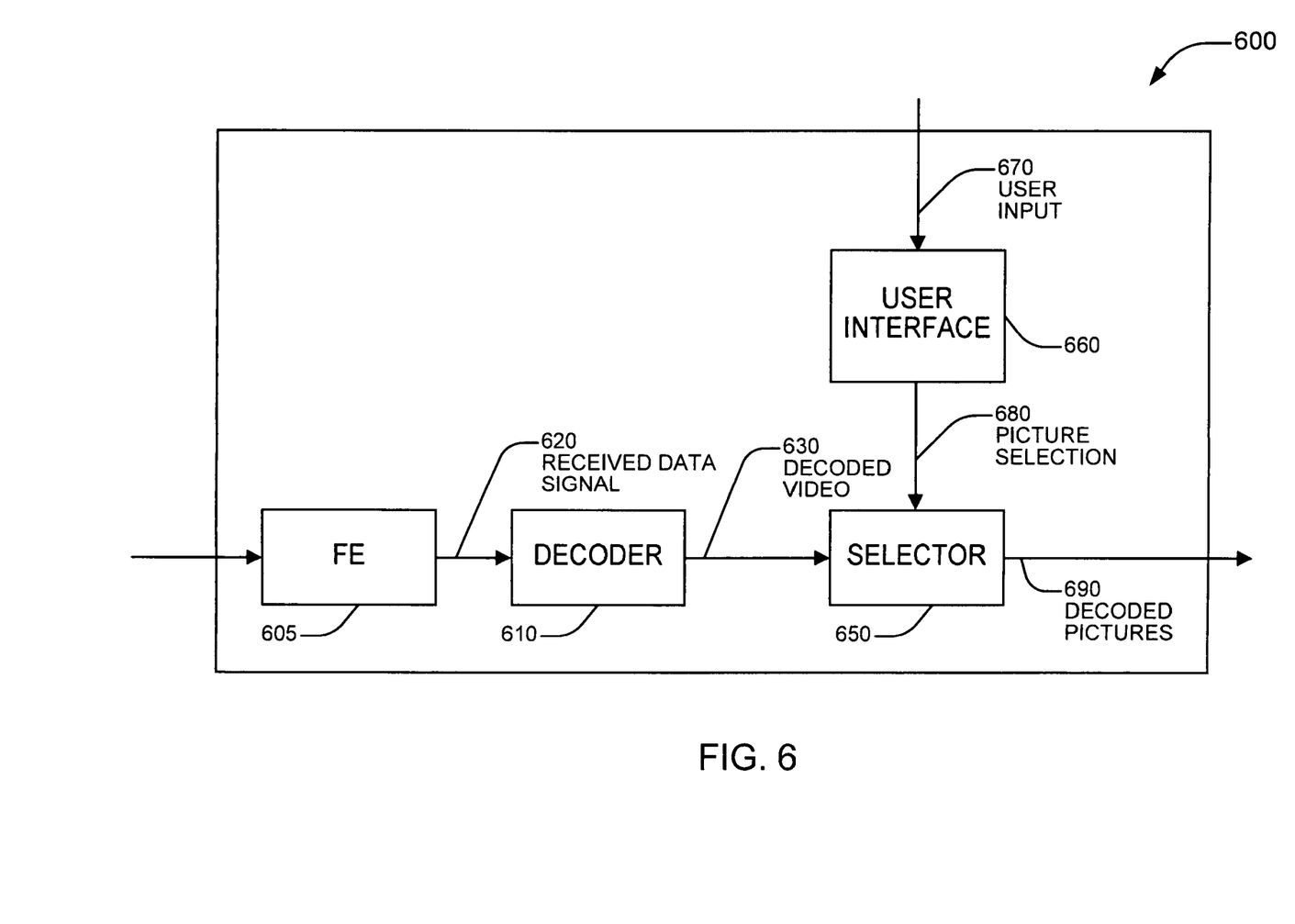
FIG. 6 is a diagram of an implementation of a video processing device.

FIG. 6 shows an exemplary video processing device 600 to which the present principles may be applied, in accordance with an embodiment of the present principles. The video processing device 600 may be, for example, a set top box or other device that receives encoded video and provides, for example, decoded video for display to a user or for storage. Thus, the video processing device 600 may provide its output to a television, computer monitor, or a computer or other processing device.

The video processing device 600 includes a front-end (FE) device 605 and a decoder 610. The front-end device 605 may be, for example, a receiver adapted to receive a program signal having a plurality of bitstreams representing encoded pictures, and to select one or more bitstreams for decoding from the plurality of bitstreams. Typical receivers perform functions such as, for example, one or more of receiving a modulated and encoded data signal, demodulating the data signal, decoding one or more encodings (for example, channel coding and/or source coding) of the data signal, and/or error-correcting the data signal. The front-end device 605 may receive the program signal from, for example, an antenna (not shown). The front-end device 605 provides a received data signal to the decoder 610.

The decoder 610 receives a data signal 620. The data signal 620 may include, for example, one or more Advanced Video Coding (AVC), Scalable Video Coding (SVC), or Multi-view Video Coding (MVC) compatible streams.

AVC refers more specifically to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard" or simply "AVC").

MVC refers more specifically to a multi-view video coding ("MVC") extension (Annex H) of the AVC standard, referred to as H.264/MPEG-4 AVC, MVC extension (the "MVC extension" or simply "MVC").

SVC refers more specifically to a scalable video coding ("SVC") extension (Annex G) of the AVC standard, referred to as H.264/MPEG-4 AVC, SVC extension (the "SVC extension" or simply "SVC").

The decoder 610 decodes all or part of the received signal 620 and provides as output a decoded video signal 630. The decoded video 630 is provided to a selector 650. The device 600 also includes a user interface 660 that receives a user input 670. The user interface 660 provides a picture selection signal 680, based on the user input 670, to the selector 650. The picture selection signal 680 and the user input 670 indicate which of multiple pictures, sequences, scalable versions, views, or other selections of the available decoded data a user desires to have displayed. The selector 650 provides the selected picture(s) as an output 690. The selector 650 uses the picture selection information 680 to select which of the pictures in the decoded video 630 to provide as the output 690.

In various implementations, the selector 650 includes the user interface 660, and in other implementations no user interface 660 is needed because the selector 650 receives the user input 670 directly without a separate interface function being performed. The selector 650 may be implemented in software or as an integrated circuit, for example. In one implementation, the selector 650 is incorporated with the decoder 610, and in another implementation, the decoder 610, the selector 650, and the user interface 660 are all integrated.

In one application, front-end 605 receives a broadcast of various television shows and selects one for processing. The selection of one show is based on user input of a desired channel to watch. Although the user input to front-end device 605 is not shown in FIG. 6, front-end device 605 receives the user input 670. The front-end 605 receives the broadcast and processes the desired show by demodulating the relevant part of the broadcast spectrum, and decoding any outer encoding of the demodulated show. The front-end 605 provides the decoded show to the decoder 610. The decoder 610 is an integrated unit that includes devices 660 and 650. The decoder 610 thus receives the user input, which is a user-supplied indication of a desired view to watch in the show. The decoder 610 decodes the selected view, as well as any required reference pictures from other views, and provides the decoded view 690 for display on a television (not shown).

Continuing the above application, the user may desire to switch the view that is displayed and may then provide a new input to the decoder 610. After receiving a "view change" from the user, the decoder 610 decodes both the old view and the new view, as well as any views that are in between the old view and the new view. That is, the decoder 610 decodes any views that are taken from cameras that are physically located in between the camera taking the old view and the camera taking the new view. The front-end device 605 also receives the information identifying the old view, the new view, and the views in between. Such information may be provided, for example, by a controller (not shown in FIG. 6) having information about the locations of the views, or the decoder 610. Other implementations may use a front-end device that has a controller integrated with the front-end device.

The decoder 610 provides all of these decoded views as output 690. A post-processor (not shown in FIG. 6) interpolates between the views to provide a smooth transition from the old view to the new view, and displays this transition to the user. After transitioning to the new view, the post-processor informs (through one or more communication links not shown) the decoder 610 and the front-end device 605 that only the new view is needed. Thereafter, the decoder 610 only provides as output 690 the new view.

The system 600 may be used to receive multiple views of a sequence of images, and to present a single view for display, and to switch between the various views in a smooth manner. The smooth manner may involve interpolating between views to move to another view. Additionally, the system 600 may allow a user to rotate an object or scene, or otherwise to see a three-dimensional representation of an object or a scene. The rotation of the object, for example, may correspond to moving from view to view, and interpolating between the views to obtain a smooth transition between the views or simply to obtain a three-dimensional representation. That is, the user may "select" an interpolated view as the "view" that is to be displayed.

In at least one described implementation it is proposed to perform depth estimation for the target views in a joint way rather than independently.

From camera geometry, disparity (d) between two views and object depth (z) are convertible using the follow equation:

$$d = \frac{f \cdot l}{z} + du \qquad (1)$$

In Equation (1), f is the focal length of the camera lens, l is the baseline spacing (also known as camera distance), and du is the difference in the principal point offset.

To briefly explain du, let $u_i$ indicate the difference between the center of the image and the center of the optical system, for a given camera i. That is, $u_i$ is the offset of the center of the image from the center of the optical center, for camera i. Then du, or more specifically $du_{i,j}$, is the difference between $u_i$ and $u_j$, where i and j are two cameras/views.

Disparity refers to the shift or translation between a location in one view and a corresponding location in another view. Depth refers to the distance from the camera plane to the object in the video. Both disparity and depth can vary from pixel to pixel. Depth is a value that applies to a single view. Additionally, focal length applies to a single view. However, disparity and du are relative values that describe a relationship between corresponding pixels within two views. Additionally, l describes the distance between two cameras, or more generally l descries a relationship (distance) between two views (cameras are at the view locations).

It is noted that in many depth estimation methods, disparity (d) is first estimated and then converted to depth (z), because disparity is the correspondence between two views and can be identified by searching for the most similar pixel in the other view(s) with a cost function (also referred to as a distortion) such as mean-squared error (MSE) or sum of absolute difference (SAD), and so forth.

Without sacrificing generality, we provide an example of how one might generate depth maps based on the captured views. We assume that we have video for 5 views captured, namely view 1 to view 5, and we want to estimate the depth maps for view 2 and view 4. In one possible process, video from views 1, 2, and 3 is used as input so as to estimate the depth map of view 2. Similarly, video from views 3, 4, and 5 is used as input in order to estimate the depth map of view 4. In this manner, the depth maps of view 2 and view 4 are generated independently. It is worth noting that view 3 is shared in the two depth map estimation processes we just described. But the depth estimation for views 2 and 4 are still independent.

We propose at least one embodiment that uses the video from view 3 to link the two estimation processes in the following way. For each pixel in view 3, let $d_{32}$ denote the disparity from view 3 to view 2, and let $d_{34}$ denote the disparity from view 3 to view 4. When the pixel is not occluded in any of the three views, that is, $d_{32}$ and $d_{34}$ are valid disparities, they shall satisfy Equation (2) provided that the du's in Equation (1) are zero and the cameras are equally spaced (same l) and all cameras share the same focal length (f). Equation (2) is as follows:

$$d_{32} = -d_{34} \qquad (2)$$

Without the simplifications of zero du's, equally spaced cameras and the same focal lengths, Equation (2) can be replaced with a more complicated form, as explained below. In other words, the relationship between $d_{32}$ and $d_{34}$ can still be determined (that is, there are constraints that $d_{32}$ and $d_{34}$ should satisfy).

The fact that $d_{32}$ and $d_{34}$ should satisfy certain constraints can be used for a joint depth estimation for a depth map of view 2 and a depth map of view 4.

A slightly more general constraint is now developed.

From equation (1), we have:

$$d_{32} = \frac{f_3 l_{32}}{z_3} + du_{32} \qquad (3)$$

Equation (3) can be rearranged as:

$$z_3 = \frac{f_3 l_{32}}{d_{32} - du_{32}} \qquad (4)$$

Similarly, from equation (1), we have:

$$d_{34} = \frac{f_3 l_{34}}{z_3} + du_{34} \qquad (5)$$

Equation (5) can be rearranged as:

$$z_3 = \frac{f_3 l_{34}}{d_{34} - du_{34}} \qquad (6)$$

The right-hand side of equations (4) and (6) can be equated as:

$$\frac{f_3 l_{32}}{d_{32} - du_{32}} = \frac{f_3 l_{34}}{d_{34} - du_{34}} \qquad (7)$$

Equation (7) can be rearranged as:

$$(d_{34} - du_{34}) = \frac{f_3 l_{34}}{f_3 l_{32}} (d_{32} - du_{32}) \qquad (8)$$

Equation (8) simplifies to:

$$(d_{34} - du_{34}) = \frac{l_{34}}{l_{32}} (d_{32} - du_{32}) \qquad (9)$$

If the cameras are equally spaced, then $l_{34} = -l_{32}$. Accordingly, equation (9) simplifies to equation (2) if the du values are zero, and the cameras are equally spaced. Equation (9) does illustrate, however, a slightly more general constraint between $d_{34}$ and $d_{32}$. Of course, other constraints are also possible and envisioned.

Both of equations (2) and (9) describe a constraint that provides a relationship between a depth indicator (disparity) for one view (for example, $d_{32}$) and a depth indicator for another view (for example, $d_{34}$, for corresponding locations in the two views. The locations typically refer to actual pixels. The depth indicator in equations (2) and (9) may, equivalently, be represented as depth.

The constraint is based on one or more camera parameters, such as, for example, $du_{34}$, $du_{32}$, $l_{34}$, and $l_{32}$. $du_{32}$ and $du_{34}$ can be derived from camera parameters by taking the difference in principal point offsets of two views. Principal point offset is one of the intrinsic camera parameters. Additionally, f (focal length of the camera lens) is also an intrinsic camera parameter, and may be part of a constraint in other implementations. $l_{34}$ and $l_{32}$ (baseline camera spacings) can calculated from extrinsic camera parameters.

Embodiment 1

In this embodiment, four steps are proposed. Variations, however, may include a different number of steps.

Step 1.

For a current pixel in view 3, $d_{32}$ and $d_{34}$ are estimated and stored respectively. If the two disparities $d_{32}$ and $d_{34}$ satisfy (or almost satisfy within a given threshold) the relationship in Equation (2), indicating that both are reliable, then the two disparities will be updated, for example using Equation (10) as set forth below. Then the process moves on to the next pixel and performs from Step 1. Equation (10) is as follows:

$$d'_{32} = (d_{32} - d_{34})/2$$

$$d'_{34} = -(d_{32} - d_{34})/2 \quad (10)$$

Otherwise, if $d_{32}$ and $d_{34}$ do not satisfy Equation (2) within a given threshold, then go to Step 2.

Estimating a disparity, such as for example $d_{32}$, can be performed in various ways. In one implementation, a block-based comparison is performed between a block centered on the current pixel in view 3 and a similarly sized block in view 2 centered on a selected pixel. The selected pixel reflects a particular disparity. The block-based comparison may be a computation of MSE of SAD, for example, and a distortion (or cost) is determined for the particular disparity. The selected pixel (and, therefore, the particular disparity) can then be changed, and a new block-based comparison can be performed and a new distortion can be determined. A series of possible disparities can be evaluated, and the disparity resulting in the lowest distortion can be selected as the estimate for $d_{32}$.

Step 2.

Step 2 relates to the case when $d_{32}$ and $d_{34}$ do not satisfy Equation (2) within a given threshold. The given threshold may be, for example, an offset or a scale factor. In one implementation, the estimated value of $d_{32}$ must be within four pixels (a threshold offset) of the constrained value of $d_{32}$ (as predicted, for example, by Equation (2) or Equation (9)). In another implementation, the estimated value of $d_{32}$ must be within five percent (a scale factor threshold) of the constrained value of $d_{32}$ (as predicted, for example, by Equation (2) or Equation (9)).

Let $E_{32}$ and $E_{34}$ represent the estimation cost (distortion) for $d_{32}$ and $d_{34}$, respectively. For example, the MSE between pixels is a typical estimation cost for disparity estimation. That is, because the estimates are not perfect, there is a cost (penalty) in rendering new views based on the estimated disparity. Of course, other cost functions can also be utilized, while maintaining the spirit of the present principles. Since we already know that at least one of the estimations of $d_{32}$ and $d_{34}$ is not reliable as it/they does/do not satisfy (2), if one of $E_{32}$ and $E_{34}$ is significantly larger than the other, it is likely that the disparity estimation with the larger estimation cost has failed to find a good matching pixel. We will mark that disparity estimation as a hole in the disparity map and keep only the disparity with smaller estimation cost, and then proceed to Step 3. In various implementations, the determination of whether one of $E_{32}$ and $E_{34}$ is significantly larger than the other is made by determining whether the difference between $E_{32}$ and $E_{34}$ is larger than a given threshold.

If $E_{32}$ and $E_{34}$ are not significantly different (for example, the absolute value of the difference between $E_{32}$ and $E_{34}$ is not larger than the given threshold), it becomes ambiguous for us to determine which one is more reliable. We propose for this scenario to go back to Step 1 and perform disparity estimation with updated search parameters. For example, the search range can be increased in order to find better matches. The block size may also be changed. Equation (2) will be checked again as well as $E_{32}$ and $E_{34}$ to determine if we can proceed to Step 3. The number of iterations should be monitored to avoid an infinite estimation loop. If a given number of iterations has been performed but the process still cannot find reliable disparity values, then a hole pixel will be marked for each disparity map (view 2 and view 4) and the method proceeds to Step 3.

Note that we have used thresholds to determine whether the disparities adequately satisfy the constraint. We have also used thresholds to determine whether the distortions are significant different. However, other implementations assign a confidence to the pair of disparity values in one or more of these scenarios. Based on the measure of confidence, any of a number of actions may be taken. Some implementations provide the measure of confidence to a user or a rendering device.

Step 3.

If there are remaining pixels to be processed, then move on to the next pixel and go to Step 1. Otherwise, go to Step 4.

Step 4. Hole-Filling:

If there are hole-pixels in the disparity maps of view 2 and/or view 4, the hole-pixels are being filled in this step. In one implementation, the holes can be filled using some interpolation algorithm based on the neighboring disparity pixels. In other implementations, the hole can just be filled using the neighboring depth level that is further away (background preferred) from the cameras (that is, simply select the smaller disparity/larger depth).

Note also that the above process of building a disparity (for example, for view 2) determines disparity for locations in view 2 that correspond to locations in view 3. However, the loop is taken over locations in view 3. Accordingly, there may be locations in view 2 for which no location in view 3 has a corresponding location. Such locations in view 2 are simply retained as holes in the view 2 disparity map.

Conversely, multiple locations in view 3 may produce a disparity that maps to the same location in view 2. In such cases, the larger disparity (smaller depth) is preferred because it indicates a foreground object.

Figure 7A:
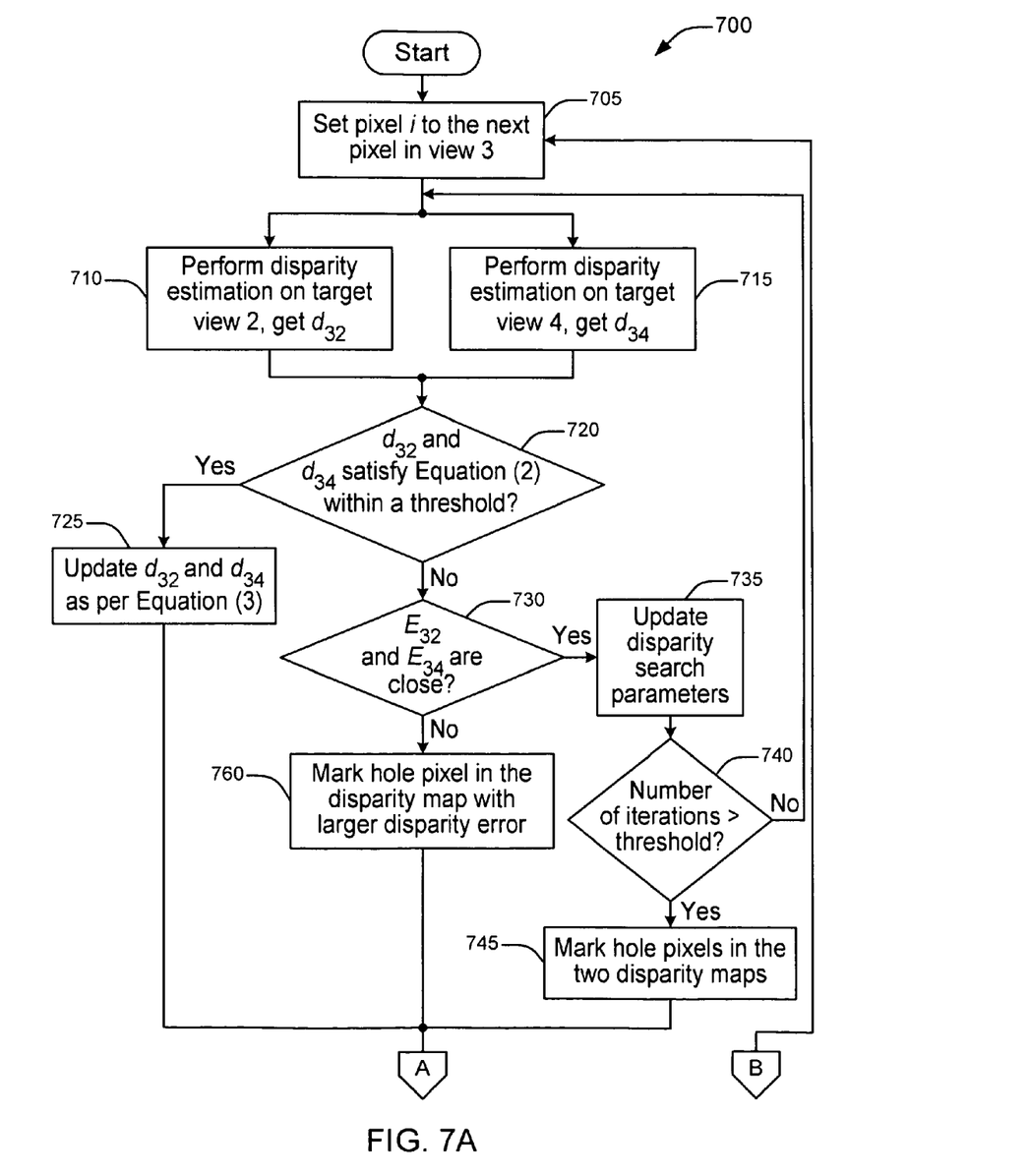
FIGS. 7A and 7B, is a diagram of an implementation of a first depth estimation process.
Figure 7B:
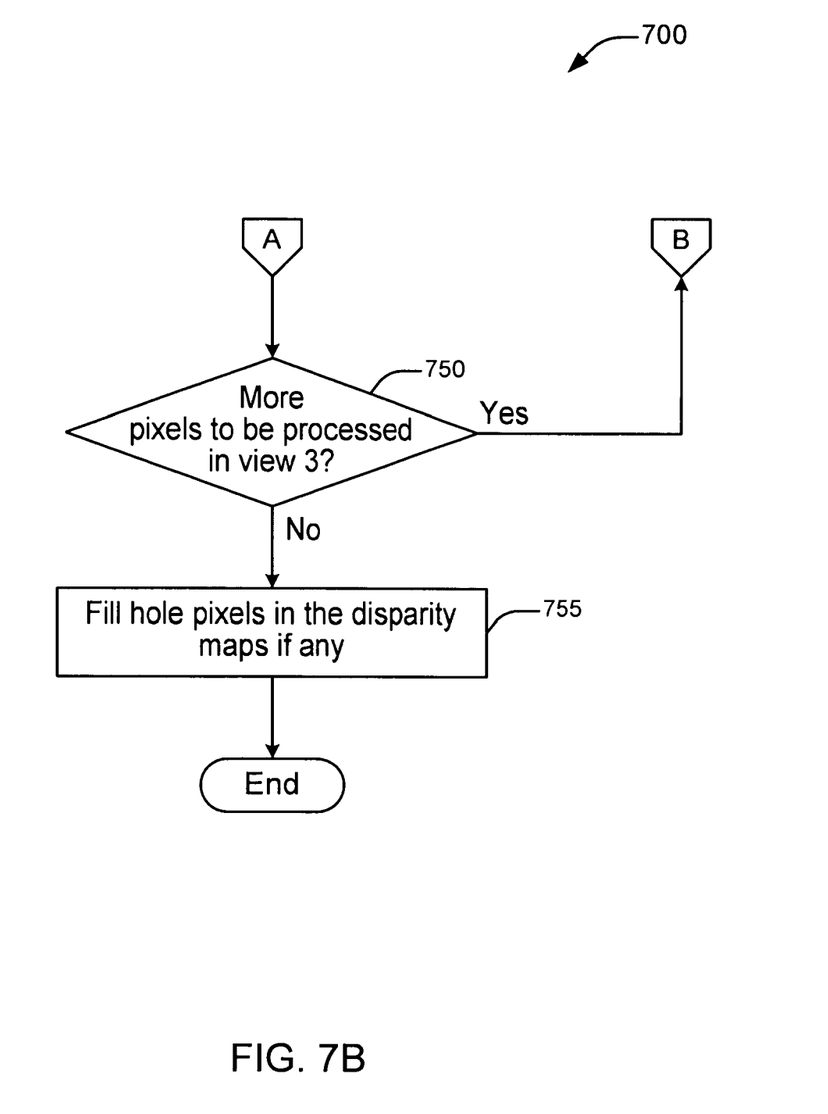

The procedure of Embodiment 1 is shown in FIG. 7. FIG. 7 shows an exemplary method 700 for estimating depth in accordance with an embodiment of the present principles. Method 700 may be performed, for example, by depth estimator 300 of FIG. 3. Note that the view numbers in FIG. 7 and the following text are simply for illustration/explanation purposes. The general concept can be applied to jointly estimate depth map of two views. At step 705, pixel i is set to the next pixel in view 3. At step 710, disparity estimation is performed on target view 2 to get disparity $d_{32}$. At step 715, disparity estimation is performed on target view 4 to get disparity $d_{34}$. At step 720, it is determined whether or not $d_{32}$ and $d_{34}$ satisfy Equation (2) within a given threshold. If so, then the method proceeds to step 725. Otherwise, the method proceeds to step 730. At step 725, $d_{32}$ and $d_{34}$ are updated as per Equation (10). Note that this step 725 provides consistency for the corresponding disparity values for depth maps for views 2 and 4. At step 730, it is determined whether or not the estimation costs $E_{32}$ and $E_{34}$ are close to each other (for example, within a threshold amount). If so, then the method proceeds to step 735. Otherwise, the method proceeds to step 760. At step 735, the disparity search parameters are updated. At step 740, it is determined whether or not the number of iterations is greater than a threshold (number of iterations). If so, then the method proceeds to step 745. Otherwise, the method returns to steps 710 and 715. At step 745, hole pixels in the two disparity maps view 2 and view 4 are marked. At step 760, a hole pixel in the disparity map with larger disparity error is marked. At step 750, it is determined whether or not there are more pixels to be processed in view 3. If so, then the method returns to step 705. Otherwise, the method proceeds to step 755. At step 755, hole pixels, if any, in the disparity maps are filled.

Embodiment 2

Different from Embodiment 1, we propose a joint estimation cost (distortion) function such that the two disparity ($d_{32}$ and $d_{34}$) search procedures are combined into a single one. The relationship shown in Equation (2) is used to design a joint disparity search process. For every candidate disparity $d_{32}$, we have a corresponding disparity $d_{34}$ based on Equation (2) and thus a joint estimation cost function from $d_{32}$ and $d_{34}$ can be calculated. For example, the joint estimation cost function can be as simple as the sum of $E_{32}$ and $E_{34}$, $E_{joint}=E_{32}+E_{34}$, where $d_{32}$ and $d_{34}$ satisfy Equation (2). Advanced metrics, such as, for example, a weighted sum based on camera distances can be used as alternative metrics. Different disparity pairs are evaluated and the one resulting in the lowest estimation cost $E_{joint}$ is selected. The different disparity pairs are generated in a manner similar to Embodiment 1, which loops over a predetermined range of possible disparity values for $d_{32}$. For each pixel, the selected disparity in this embodiment will produce disparity vectors that satisfy Equation (2), leading to consistency in the two depth maps.

Figure 8:
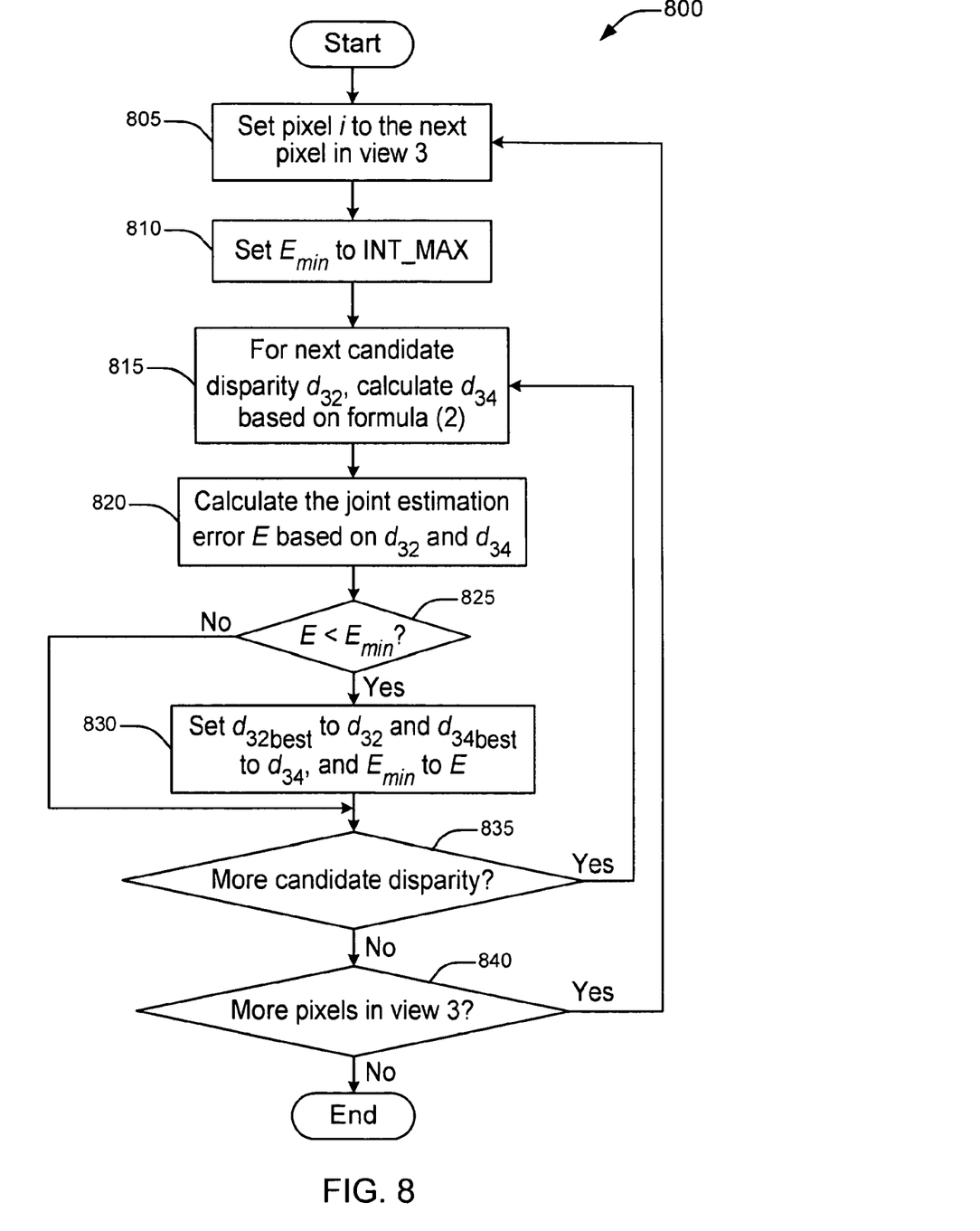
FIG. 8 is a diagram of an implementation of a second depth estimation process.

The procedure of Embodiment 2 is shown in FIG. 8. FIG. 8 shows another exemplary method 800 for estimating depth in accordance with an embodiment of the present principles. Method 800 may be performed, for example, by depth estimator 300 of FIG. 3. Note that the view numbers in FIG. 8 and the following text are simply for illustration/explanation purposes. The general concept can be applied to jointly estimate depth map of two views. At step 805, pixel i is set to the next pixel in view 3. At step 810, $E_{min}$ is set to INT_MAX, which is the largest available integer. At step 815, for the next candidate disparity $d_{32}$, $d_{34}$ is calculated based on Equation (2). At step 820, the joint estimation error E is calculated based on $d_{32}$ and $d_{34}$. At step 825, it is determined whether or not E is smaller than $E_{min}$. If so, then the method proceeds to step 830. Otherwise, the method proceeds to step 835. At step 830, $d_{32best}$ is set to $d_{32}$, $d_{34best}$ is set to $d_{34}$, and $E_{min}$ is set to E. The method proceeds to step 835. At step 835, it is determined whether or not there exists any more candidate disparity to be evaluated. If so, then the method returns to step 815. Otherwise, the method proceeds to step 840. At step 840, it is determined whether or not there are any more pixels in view 3. If so, then the method returns to step 805. Otherwise, the method is terminated.

Embodiments 1 and 2 are used together in some implementations. For example, although embodiments 1 and 2 may work equally well in many or all conditions, it is possible that embodiment 2 may work better than embodiment 1 if there are few holes. Accordingly, an implementation uses embodiment 1 in regions where holes are expected, and uses embodiment 2 elsewhere.

It should be clear that implementations can be performed at an encoder or a decoder. In one implementation, depth estimation is performed at an encoder (or, for example, a preprocessor) and then the estimated depth is transmitted with, or without, the video. In another implementation, video is transmitted without any depth, and a receiver performs the depth estimation.

In cases for which the depth is not estimated before transmission of the video, and so no depth is transmitted, various implementations transmit information about camera parameters. In several implementations, one or more constraints are transmitted so that the receiver knows the constraints to use in estimating multiple depth maps jointly. In one such implementation, a standardized format is used in transmission to encode and transmit the number of cameras, the spacing between the cameras, the du values, and the focal lengths. In another implementation, due to assumptions that the focal lengths are the same for each camera and that the du values are zero for each camera, the system encodes and transmits only the spacing between cameras for the determination of the constraints.

We note that joint depth estimation for multiple depth maps may be performed in which the multiple maps are from different views, or from the same view. For example, the multiple maps may be from the same view at different times.

Further, implementations may jointly estimate depth maps in various relative positions with respect to a common video picture from a given view. For example, several implementations jointly estimate depth maps for views 1 and 2, using video from view 3. In one such implementation, view 3 is positioned between views 1 and 2. In another such implementation, view 3 is positioned as the left-most view of views 1-3. In yet another such implementation, view 3 is positioned as the right-most view of views 1-3.

Additionally, other implementations jointly estimate three or more depth maps. In such implementations, one or more constraints are determined that provide a relationship among the three or more depth maps. For example, view 3 in the examples above may be used to determine the depth maps not only for views 2 and 4, but also for view 5. It is straightforward to determine the relationship between $d_{32}$, $d_{34}$, and $d_{35}$ using the above-derived equations.

Several of the implementations and features described in this application may be used in the context of the H.264/MPEG-4 AVC (AVC) Standard, or the AVC standard with the MVC extension, or the AVC standard with the SVC extension. However, these implementations and features may be used in the context of another standard (existing or future), or in a context that does not involve a standard.

We thus provide one or more implementations having particular features and aspects. However, features and aspects of described implementations may also be adapted for other implementations.

Implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method performed by a video coding system, the method comprising:
   estimating a first-view depth indicator for a location in a first view, and
   estimating a second-view depth indicator for a corresponding location in a second view, wherein the estimating of the first-view depth indicator and the estimating of the second-view depth indicator jointly satisfy a constraint relating the first-view depth indicator directly with respect to the second-view depth indicator for corresponding locations,
   wherein estimating the first-view depth indicator and the second-view depth indicator comprises:
      determining that the depth indicators have values differing by more than a depth-indicator threshold from the relationship provided by the constraint;
      determining a first-view distortion for the first-view depth indicator;
      determining a second-view distortion for the second-view depth indicator;
      marking the location in the first view as a hole if the first-view distortion is greater than the second-view distortion by a distortion threshold; and
      marking the corresponding location in the second view as a hole if the second-view distortion is greater than the first-view distortion by the distortion threshold.

2. The method of claim 1 further comprising filling the hole using a depth indicator, for a location neighboring the marked location, that indicates the largest depth among locations neighboring the marked location.

3. An apparatus comprising:
means for estimating a first-view depth indicator for a location in a first view, and means for estimating a second-view depth indicator for a corresponding location in a second view, wherein the estimating of the first-view depth indicator and the second-view depth indicator jointly satisfy a constraint relating the first-view depth indicator directly with respect to the second-view depth indicator for corresponding locations wherein the means for estimating the first-view depth indicator and the means for estimating the second-view depth indicator are each configured for:
 determining that the depth indicators have values differing by more than a depth-indicator threshold from the relationship provided by the constraint;
 determining a first-view distortion for the first-view depth indicator;
 determining a second-view distortion for the second-view depth indicator;
 marking the location in the first view as a hole if the first-view distortion is greater than the second-view distortion by a distortion threshold; and
 marking the corresponding location in the second view as a hole if the second-view distortion is greater than the first-view distortion by the distortion threshold.

4. A non-transitory processor readable medium having stored therein instructions for causing a processor to perform at least the following:
 estimating a first-view depth indicator for a location in a first view and estimating a second-view depth indicator for a corresponding location in a second view, wherein the estimating of the first-view depth indicator and the estimating of the second-view depth indicator jointly satisfy a constraint relating the first-view depth indicator directly with respect to the second-view depth indicator for corresponding locations wherein estimating the first-view depth indicator and the second-view depth indicator comprises:
  determining that the depth indicators have values differing by more than a depth-indicator threshold from the relationship provided by the constraint;
  determining a first-view distortion for the first-view depth indicator;
  determining a second-view distortion for the second-view depth indicator;
  marking the location in the first view as a hole if the first-view distortion is greater than the second-view distortion by a distortion threshold; and
  marking the corresponding location in the second view as a hole if the second-view distortion is greater than the first-view distortion by the distortion threshold.

5. An apparatus, comprising a processor configured to perform at least the following:
 estimating a first-view depth indicator for a location in a first view and estimating a second-view depth indicator for a corresponding location in a second view, wherein the estimating of the first-view depth indicator and the estimating of the second-view depth indicator jointly satisfy a constraint relating the first-view depth indicator directly with respect to the second-view depth indicator for corresponding locations wherein estimating the first-view depth indicator and the second-view depth indicator comprises:
  determining that the depth indicators have values differing by more than a depth-indicator threshold from the relationship provided by the constraint;
  determining a first-view distortion for the first-view depth indicator;
  determining a second-view distortion for the second-view depth indicator;
  marking the location in the first view as a hole if the first-view distortion is greater than the second-view distortion by a distortion threshold; and
  marking the corresponding location in the second view as a hole if the second-view distortion is greater than the first-view distortion by the distortion threshold.

6. An apparatus comprising:
a depth estimator for estimating a first-view depth indicator for a location in a first view and a depth estimator for estimating a second-view depth indicator for a corresponding location in a second view, the estimating of the first-view depth indicator and the estimating of the second-view depth indicator jointly satisfy a constraint relating the first-view depth indicator directly with respect to the second-view depth indicator for corresponding locations wherein the depth estimator for estimating the first-view depth indicator and the depth estimator for estimating the second-view depth indicator are each configured for:
 determining that the depth indicators have values differing by more than a depth-indicator threshold from the relationship provided by the constraint;
 determining a first-view distortion for the first-view depth indicator;
 determining a second-view distortion for the second-view depth indicator;
 marking the location in the first view as a hole if the first-view distortion is greater than the second-view distortion by a distortion threshold; and
 marking the corresponding location in the second view as a hole if the second-view distortion is greater than the first-view distortion by the distortion threshold.

7. An apparatus comprising:
a depth estimator for estimating a first-view depth indicator for a location in a first view and a depth estimator for estimating a second-view depth indicator for a corresponding location in a second view, wherein the estimating of the first-view depth indicator and the estimating of the second-view depth indicator jointly satisfy a constraint relating the first-view depth indicator directly with respect to the second-view depth indicator for corresponding locations wherein the depth estimator for estimating the first-view depth indicator and the depth estimator for estimating the second-view depth indicator are each configured for:
 determining that the depth indicators have values differing by more than a depth-indicator threshold from the relationship provided by the constraint;
 determining a first-view distortion for the first-view depth indicator;
 determining a second-view distortion for the second-view depth indicator;
 marking the location in the first view as a hole if the first-view distortion is greater than the second-view distortion by a distortion threshold; and
  marking the corresponding location in the second view as a hole if the second-view distortion is greater than the first-view distortion by the distortion threshold; and
a modulator for modulating a signal that includes an encoding of one or more of the first-view depth indicator or the second-view depth indicator.

8. An apparatus comprising:
a demodulator for demodulating a signal that includes video from a first view and video from a second view; and
a depth estimator for estimating a first-view depth indicator for a location in the first view and a depth estimator for estimating a second-view depth indicator for a corresponding location in the second view, wherein the estimating of the first-view depth indicator and the estimating of the second-view depth indicator jointly satisfy a constraint relating the first-view depth indicator directly with respect to the second-view depth indicator for corresponding locations wherein the depth estimator for estimating the first-view depth indicator and the depth estimator for estimating the second-view depth indicator are each configured for:
determining that the depth indicators have values differing by more than a depth-indicator threshold from the relationship provided by the constraint;
determining a first-view distortion for the first-view depth indicator;
determining a second-view distortion for the second-view depth indicator;
marking the location in the first view as a hole if the first-view distortion is greater than the second-view distortion by a distortion threshold; and
marking the corresponding location in the second view as a hole if the second-view distortion is greater than the first-view distortion by the distortion threshold.

\* \* \* \* \*